(12) United States Patent
Milliken et al.

(10) Patent No.: US 7,573,889 B1
(45) Date of Patent: Aug. 11, 2009

(54) SYSTEMS AND METHODS FOR EFFICIENT BUFFERING AND METERING OF HIGH-SPEED FLOWS

(75) Inventors: Walter C. Milliken, Dover, NH (US); Christine E. Jones, Spokane Valley, WA (US)

(73) Assignees: Verizon Corporate Services Group Inc., Basking Ridge, NJ (US); BBN Technologies Corp., Cambridge, MA (US)

( * ) Notice: Subject to any disclaimer, the term of this patent is extended or adjusted under 35 U.S.C. 154(b) by 287 days.

(21) Appl. No.: 10/850,563

(22) Filed: May 21, 2004

Related U.S. Application Data

(60) Provisional application No. 60/473,682, filed on May 28, 2003.

(51) Int. Cl.
*H04L 12/28* (2006.01)

(52) U.S. Cl. .................................. 370/399; 370/395.4

(58) Field of Classification Search .................. None
See application file for complete search history.

(56) References Cited

U.S. PATENT DOCUMENTS

| 5,499,238 | A | * | 3/1996 | Shon .......................... 370/399 |
| 5,533,020 | A | * | 7/1996 | Byrn et al. ................. 370/395.4 |
| 6,088,734 | A | * | 7/2000 | Marin et al. ................ 709/232 |
| 6,910,109 | B2 | * | 6/2005 | Holman et al. ............. 711/156 |

OTHER PUBLICATIONS

Intel® IXP2800 Network Processor, Hardware Reference Manual, pp. 1-377 (Nov. 2003).

* cited by examiner

*Primary Examiner*—Robert W Wilson

(57) ABSTRACT

Systems and methods are disclosed in which one or more cells are buffered in a communication system. In one embodiment, the method includes receiving a cell; classifying the cell as one of a set of flows; transmitting the cell to one of a set of queues of static memory, such that the queue corresponds to one of a set of banks of dynamic memory; and writing the cell to the corresponding one of the set of banks.

23 Claims, 6 Drawing Sheets

SYSTEMS AND METHODS FOR EFFICIENT BUFFERING AND METERING OF HIGH-SPEED FLOWS

CROSS REFERENCE TO RELATED APPLICATION

This application claims the benefit of priority to U.S. provisional application 60/473,682, filed May 28, 2003, entitled "METHOD AND APPARATUS FOR EFFICIENT BUFFERING AND METERING OF HIGH-SPEED FLOWS," which is expressly incorporated by reference herein in its entirety.

This invention was made with Government support under Contract No MDA904-02-G-0068. The Government may have certain rights in this invention.

BACKGROUND OF THE INVENTION

I. Field of the Invention

The present invention generally relates to communication systems and, in particular, to systems and methods for efficient buffering and metering of high-speed flows.

II. Background and Material Information

At any point in a typical network, there are numerous flows of information. Specifically, at a communication device, such as a router or switch on the network, there may be various flows of datagrams, packets, or cells. Each flow may be associated with a different connection between a source and a destination. For example, there may be one or more flows associated with Voice Over Internet Protocol (VoIP) calls; other flows may be associated with hypertext transfer protocol (http) exchanges between a source processor and a web server on the Internet; while other flows may represent simple email transfers. Indeed, a telecommunications device, such as a router or switch, may process one, two, or even a thousand or more flows at any given time.

Moreover, at any given time, each of these flows may have a state that defines the flow, such as a data rate and quality of service (QoS) parameters. For example, when compared to other traffic, a VoIP flow may have higher QoS requirements, such as requiring a maximum data rate, a minimum latency, and a maximum packet loss. On the other hand, a flow associated with an email transfer may have much lower QoS requirements, when compared to a VoIP flow. To provide QoS on a flow, a communication device may meter packets. Metering polices or shapes traffic by limiting surges or bursts that congest a network. Metering regulates traffic by buffering packets before they enter a network (or link) resulting in a regulated, controlled amount of packets being sent to the network. In essence, metering provides a gate keeping function that is similar to a traffic light used on a highway on-ramp to "meter" traffic accessing the highway.

Although metering is a relatively simple QoS mechanism, it becomes a very difficult problem at very high data rates because large buffers are required to buffer the packets awaiting metered access to the network. For example, at a data rate of 1 Gigabit per second (Gbps), a buffer size of about 125 Megabytes can store 1 second of packet data. When the data rate increases to 40 Gbps, the buffer size must increase to about 5 Gigabytes to provide the same 1 second of buffering. At 100 Gbps, the buffer size must be at least 12.5 Gigabytes to provide the same 1 second buffer. Although this example describes a 1 second buffer, one of ordinary skill in the art will recognize that any size buffer (e.g., a 100 millisecond buffer) can be used instead. Since the buffer must allow fast memory access and storage—operating faster than the corresponding data rate to provide relatively seamless metering—random access memory, such as SRAM (Static Random Access Memory) and DRAM (Dynamic Random Access Memory), are currently the only practical memory technologies available.

SRAM is a type of memory that is much faster than DRAM with respect to its random access speed. Currently, SRAMs are available with random access times of 2 ns (nanoseconds) and are used, for example, in computer cache memories. On the other hand, DRAMs are currently available with random access times of about 25 ns, such as the so-called FCDRAM devices (available from Toshiba) and RLDRAM devices (available from Micron). Another difference between SRAMs and DRAMs is density. Specifically, the largest SRAMs are usually ¼ to ⅛ the size of the largest comparable DRAMs. However, even if more SRAM devices could be used to make up for the density difference when compared to larger DRAMs, it is not feasible to use more SRAMs, since very fast SRAMs may not be capable of being bussed together due to speed degradation caused by loading multiple devices on the same address, data, or control lines.

Although a buffer using only SRAM may satisfy the speed requirements of a buffer for use in a communication device, an all SRAM buffer would be too expensive since a large amount of buffer capacity is required at higher rates. Moreover, an all-SRAM buffer would operate at too high a temperature. On the other hand, an all-DRAM buffer would be practical from a cost and a heat perspective, but be too slow in terms of data access times. As such, there is a need to provide a practical buffer for use in a communication device that is fast enough to operate at high speeds.

SUMMARY OF THE INVENTION

Accordingly, the present invention is directed to systems and methods for efficient buffering and metering of high-speed flows. More particularly, the present invention is directed to buffering high-speed flows using static memory and dynamic memory to provide buffering, wherein the static memory is organized to buffer traffic on a per-dynamic memory bank basis.

A communication system consistent with the systems and methods of the present invention may receive a cell; classify the cell as one of a set of flows; transmit the cell to one of a set of queues of static memory, such that the queue corresponds to one of a set of banks of dynamic memory; and then write the cell to the corresponding bank of dynamic memory.

Additional features and advantages of the invention will be set forth in part in the description that follows or may be learned by practice of the invention. The features and advantages of the invention may be realized and attained by the system and method particularly described in the written description, the appended drawings, and the claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention.

In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

The present invention is directed to buffering high-speed flows using static and dynamic memory. In particular, high-speed flows are buffered using static memory and dynamic memory to provide buffering, wherein the static memory is organized to buffer traffic on a per-dynamic memory bank basis. As a consequence, the present invention may reduce or mask the effects of any random access latency associated with the DRAM device.

In one embodiment, a system receives a cell, such as an Asynchronous Mode Transfer (ATM) cell. The system classifies the cell as being part of a flow and assigns it an expected transmission time based on the flow state. Based on this expected transmission time, the cell is stored in one of a set of queues of static memory, along with a DRAM memory address calculated from the expected transmission time. Each queue in static memory corresponds to a bank of dynamic memory. The system then reads the cell from the queue based on a schedule that determines when each of the queues is read. The read cell is then written to a corresponding bank in dynamic memory. The buffered cell stored in dynamic memory is subsequently read based on a schedule for transmission. As such, systems and methods consistent with an embodiment of the present invention use static memory, such as SRAM, in combination with dynamic memory, such as DRAM, to provide a high-speed buffer, with each queue of static memory organized to correspond to one of a set of banks—using a relatively small SRAM memory to provide fast, SRAM-speed random access latency for a large, less expensive, lower-power DRAM buffer memory.

Figure 1:
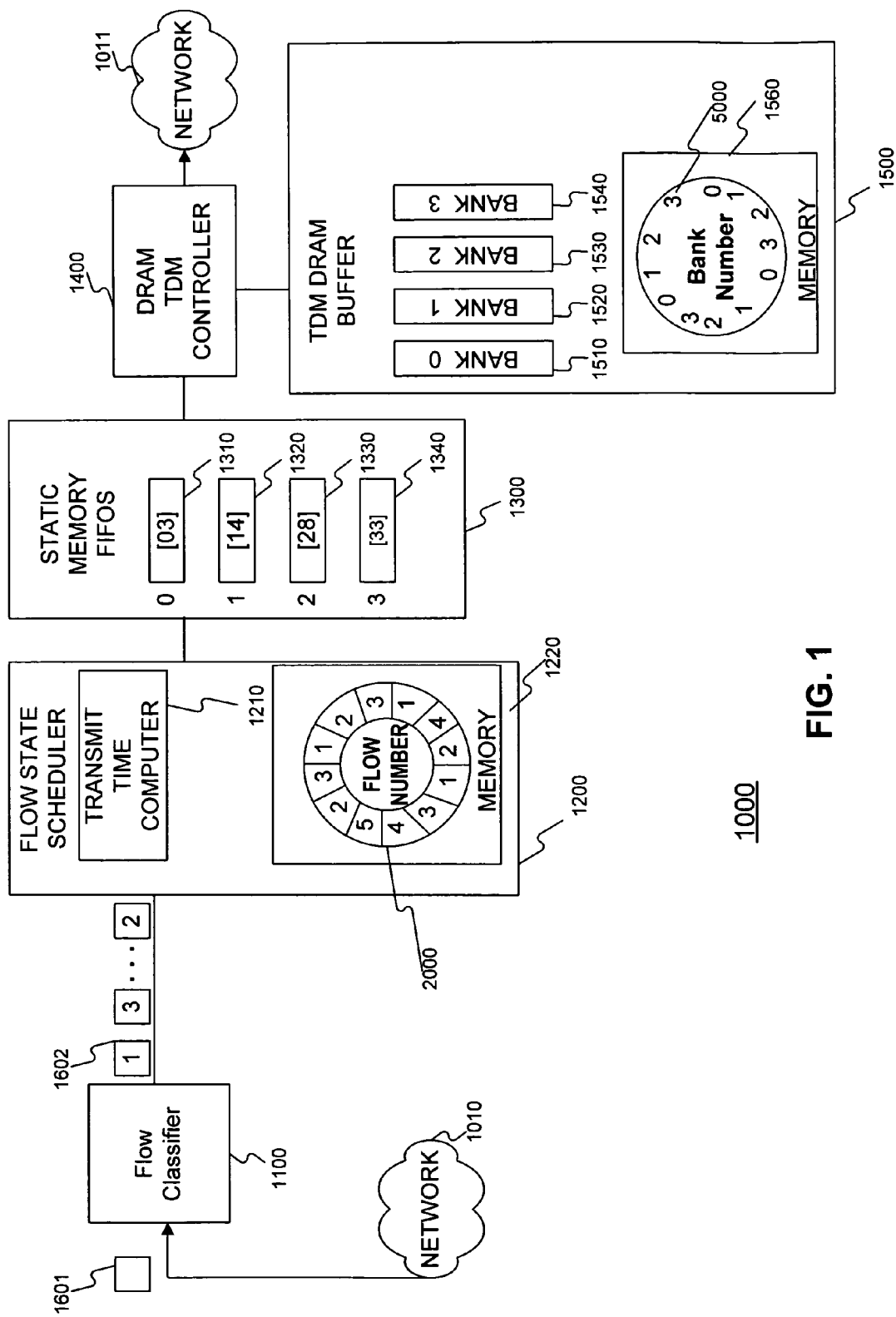
FIG. 1 illustrates an exemplary system environment in accordance with systems and methods consistent with the present invention.

FIG. 1 shows an exemplary communication system 1000 that includes, a first network 1010, a second network 1011, a flow classifier module 1100, a flow state scheduler module 1200, a static memory FIFO module 1300, a DRAM TDM controller module 1400, a TDM DRAM buffer module 1500, and one or more cells 1601-1602.

As used herein the term "cell" means a basic unit of information that is capable of being transmitted to and/or received from a communication medium, such as a network. The term "cell" as used herein may include a bit, a byte, a datagram, a packet (e.g., an Internet Protocol (IP) packet), a group of bytes, a block of bytes, an ATM cell, and/or any other package of data or information. In the embodiments described herein, the cells are fixed sized, such as ATM cells or fixed size IP packets.

Flow classifier module 1100 may function to classify received cells, such as Internet Protocol (IP) packets or Asynchronous Transfer Mode (ATM) cells. In an ATM network, flow classifier module 1100 may receive an ATM cell, read the VCI (virtual channel identifier) and VPI (virtual path identifier), and classify the cell as being part of a flow based on the VPI and VCI. In the case of IP packets, the flow classifier module 1100 may examine the IP packet header to determine the source and destination addresses, protocol number, flow label (IPv6), and/or port numbers, all of which may be used to classify a flow of IP packets. For example, flow classifier module 1100 may designate as a single flow, the cell (or cells) of a voice (or data) call between a source and destination. Moreover, flow classifier module 1100 may assign a flow number to keep track of cells associated with that call. As multiple calls are processed by flow classifier module 1100, it may assign unique flow numbers to each unique flow. For example, a source Voice Over IP (VoIP) gateway and a destination VoIP gateway may have multiple calls in progress, with each call corresponding to a different flow having a unique flow number. Flow classifier module 1100 may be embodied as a data processor (described in greater detail below), a router, a switch, and/or any other communication or processing device.

In one aspect of the invention, flow classifier module 1100 numbers each flow locally so that it can distinguish between flows. In the case of ATM, the VPI/VCI may be used directly, or hashed to a smaller number, to derive the flow number. In the IP packet case, the flow number may be determined based on a hashing operation of the various packet header fields used in the classification operation or, alternatively, on an index to a classification rule table (or memory such as a ternary content addressable memory). In the case of IPv6, the flow label may be used directly to classify a flow of packets. However, any type of numbering scheme may be used to distinguish the flows.

Flow state scheduler module 1200 may include a transmit time computer module 1210 and a memory module 1220 that includes a TDM flow state schedule 2000. Flow state scheduler module 1200 serves to determine a transmit time. The transmit time represents a time when the cell will be transmitted by (or leave) the TDM DRAM buffer module 1500. The transmit time is used to calculate where in DRAM (i.e., which bank) the cell should be stored. For example, the transmit time corresponds to a DRAM address, with each address having its own transmission time to network 1011. A portion of the DRAM address identifies one of the banks 1510-1540 and another portion identifies a location in the identified bank. Once a bank of DRAM is identified, a corresponding SRAM queue in static memory FIFOs 1300 is identified. The cell along with its transmit time information is then written to one of the queues of static memory FIFO module 1300, with each queue corresponding to one of the banks 1510-1540. Flow state scheduler module 1200 may be embodied as a data processor, a router, a switch, and/or any other communication or processing device.

In one embodiment, transmit time computer 1210 determines the actual transmission time from DRAM buffer 1500 such that no two cells have the same transmission time and that the transmit time is an integer value of cell times (not a fractional value). For example, if DRAM buffer 1500 transmits cells at a rate of 1 cell per second, the transmit time for two different cells cannot be the same because cells can only transmitted, in this example, at 1 cell time intervals.

Figure 2:
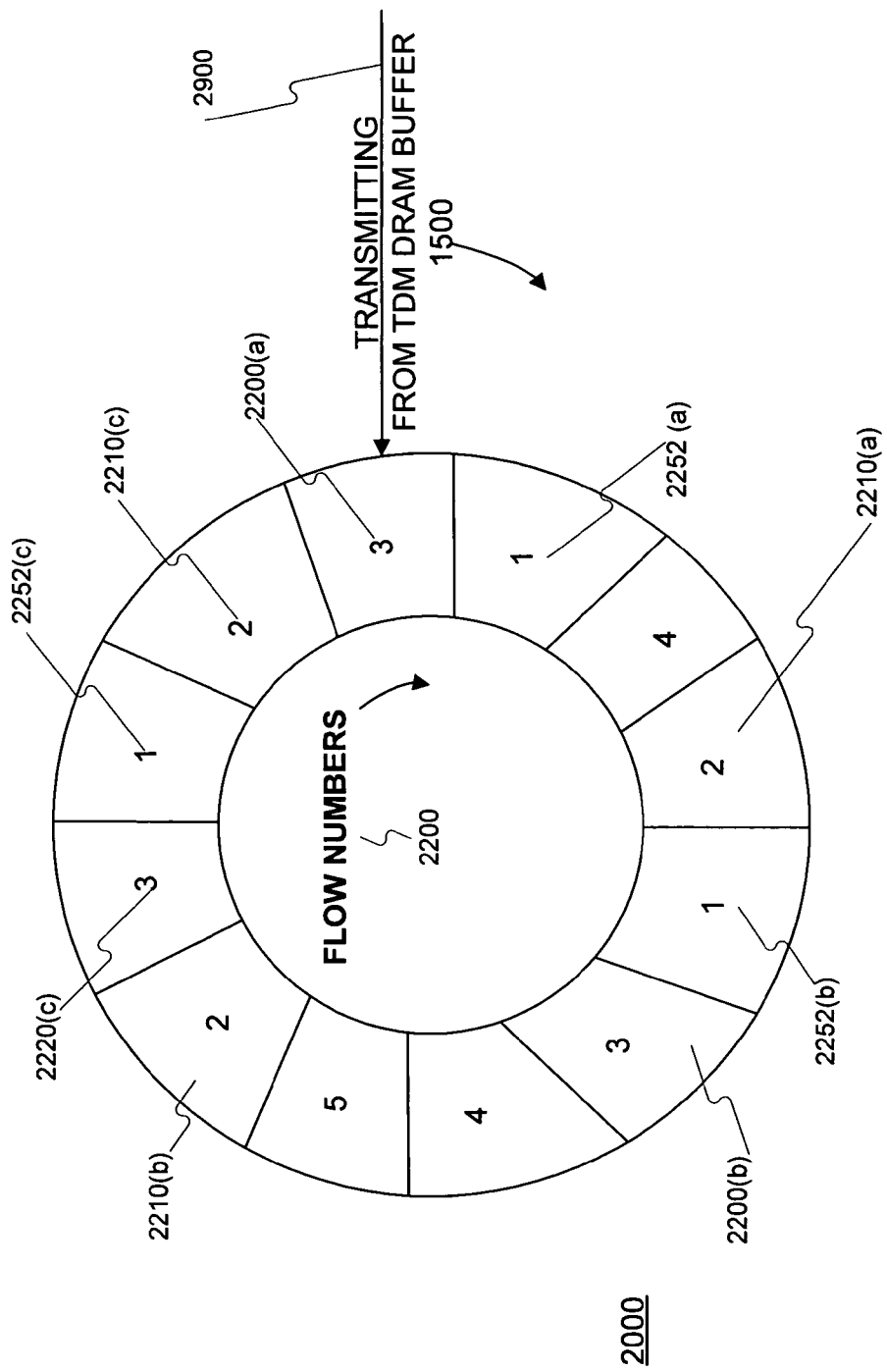
FIG. 2 is a diagram depicting an exemplary time division multiplexing (TDM) based schedule in accordance with systems and methods consistent with the present invention.

In one embodiment, transmit time computer module 1210 uses the TDM flow state schedule 2000 depicted in FIG. 2. Referring to FIG. 2, the outer ring of numbers represents flow numbers 2200. The TDM schedule 2000 may be stored in memory 1220 as a table that maps a flow number to a schedule of transmit times from DRAM buffer module 1500. The following example illustrates the operation of schedule 2000. Flows are essentially a collection or stream of one or more cells. When a cell is classified as being part of flow one 2252(a)-(c), transmit time computer module 1210 determines that cells associated with flow three 2220 are currently being transmitted (pointer 2900 represents the flow currently being transmitted). Transmit time computer module 1210 then determines that any cells associated with flow one must wait until its allotted slots 2252(a)-(c). For example, if the current transmission time for flow three 2200(a) is at time 1, then the allowable transmit times for flow one are at times 2 2252(a), time 5 2252(b), and time 11 2252(c). The transmit times of flow two are at times 4 2210(a), time 9 2210(b), and time 12 2210(c). Since the reads and subsequent transmissions from the banks in TDM DRAM buffer module 1500 are also scheduled (see bank schedule 5000), each packet, classified by flow, can be assigned a transmit time and a corresponding one of banks 1510-1540.

One of ordinary skill in the art will recognize that the time values noted above may represent any interval of time, such as one millisecond. Moreover, flow schedule 2000 is only exemplary and may represent other transmit times for flows. Furthermore, the use of a cyclical TDM flow schedule 2000 is only exemplary and, as such, other schemes of mapping cells in flows to transmit times may be used instead.

Flow state scheduler module 1200 may further map a cell to a specific location in static memory FIFO module 1300. For example, once a transmit time and corresponding memory address (including a bank and location within the bank which will be read and transmitted at a pre-assigned transmit time) are determined, flow state scheduler module 1200 may write the cell to a static queue based on its determined bank in module 1500. In particular, each cell is queued in one of static FIFO queues 1310-1340, with each queue 1310-1340 storing packets waiting to be written in a respective one of banks 1510-1540. For example, static memory FIFO queue zero 1310 includes packets for bank zero 1510.

Referring again to FIG. 1, static memory FIFO module 1300 may be embodied as SRAM. Static memory FIFO module 1300 serves as a queue for TDM DRAM buffer module 1500. Specifically, static memory FIFO module 1300 may be organized so that each bank 1510-1540 of TDM DRAM buffer module 1500 has its own queue 1310-1340 in static memory FIFO module 1300. For example, if TDM DRAM buffer module 1500 includes four banks, static memory FIFO module 1300 includes four queues—one queue in static memory for each bank in dynamic memory. One of ordinary skill in the art may recognize that static memory FIFO module 1300 may be embodied as any memory device that provides data access times that are better than the memory used in TDM DRAM buffer module 1500. Furthermore, one of ordinary skill may recognize that the FIFO structure of static memory 1300 may be embodied in various ways including, for example, as a memory stack.

DRAM TDM controller module 1400 functions to read a cell from static memory FIFO 1300 and write the cell to a corresponding bank 1510-1540 of TDM DRAM buffer module 1500. Moreover, DRAM TDM controller module 1400 may read cells in TDM DRAM buffer module 1500 and transmit any read cells to network 1011. In one embodiment, DRAM TDM controller module 1400 may read and write according to a schedule, such as bank schedule 5000 described in greater detail below with respect to FIG. 5. The structure of the DRAM TDM controller module 1400 may be a data processor, microprocessor, or control logic used to control memory access, which is known and commercially available. Moreover, one of ordinary skill in the art would recognize that module 1400 may be combined with module 1500.

TDM DRAM buffer module 1500 functions to store cells and is organized into banks 1510-1540, each bank having a corresponding queue (or buffer) 1310-1340 in static memory FIFO module 1300. The structure of the TDM DRAM buffer module 1500 may be one or more DRAMs, such as DDR SDRAMs (Double Data Rate Synchronous Dynamic Random-Access Memory) commercially available from Toshiba and Micron. The DRAM buffer module 1500 may be of any size. However, in one embodiment, the buffer size is typically sized based on the underlying application and the associated link rate. For example, in a typical IP packet case, the buffer size may be sized to 1 Gbit (Gigabit) of memory for every 10 Gbit per second of output link. Other applications, such as VoIP or ATM constant bit rate traffic, may require smaller buffers. Moreover, TDM DRAM buffer module 1500 may be organized such that it has adequate input/output (I/O) throughput to support at least twice the output link rate since module 1500 should be capable of supporting a read and a write operation for every cell transmitted. For example, with a 10 Gbit per second output link rate, a 32-bit wide memory having DDR, the DRAM I/O should support a clock rate of at least 312.5 MHz ((2*10 Gbits per second)/(32*2)).

Furthermore, TDM buffer module 1500 may be configured to have sufficient banks such that each banks is accessed less frequently than the minimum allowed bank random access time. In current generation SDRAMs, this time is typically somewhere between 25 to 50 ns. Each bank is accessed twice per cell time on the link (once for write and once for read) divided by the total number of banks (i.e., the time between bank accesses is (cell time/2)*number of banks). Given 53 byte cells (typical of an ATM application) and a 10 Gb/s link, the cell time on the link is approximately 42 ns. Moreover, if inexpensive SDRAM are used with a bank access time of 50 ns, at least three banks would be required ((42 ns/2)*3)=63 ns), which is greater than the minimum random bank access time of 50 ns. Since current SDRAMs typically have four or more banks, this is sufficient for a 10 Gb/s link with a small cell size.

In one embodiment, cells buffered in TDM DRAM buffer 1500 may be stored as part of a metering function that regulates traffic on a network. Alternatively, TDM DRAM Buffer 1500 may store cells to facilitate other types of processing, such as segmentation and reassembly, congestion management, congestion mitigation, traffic flow security, and fair queuing schedulers. In the case of metering, the TDM controller 1400 may reads cells from each bank based on a schedule, the cells are then transmitted to the network in a metered manner that controls congestion and bursts.

System 1000 (or its components therein) may be embodied in the form of computer or data processor that may include one or more of the following: a central processing unit, a co-processor, memory, registers, and other data processing devices and systems as appropriate. Moreover, the data processor may also be incorporated into any other data processing or communication device including, for example, a router, a cryptographic device, a gateway, a bridge, a firewall, a network security system, and/or a network management system.

Each of first network 1010 and second network 1011 may function as a communication medium and may include, alone or in any suitable combination, a telephony-based network, a local area network (LAN), a wide area network (WAN), a dedicated intranet, the Internet, a wireless network, or a bus. Further, any suitable combination of wired and/or wireless components and systems may be incorporated into the communication channels. One of ordinary skill in the art may recognize that the first and second networks 1010-1011 may be considered the same network or, alternatively, different networks.

Figure 3:
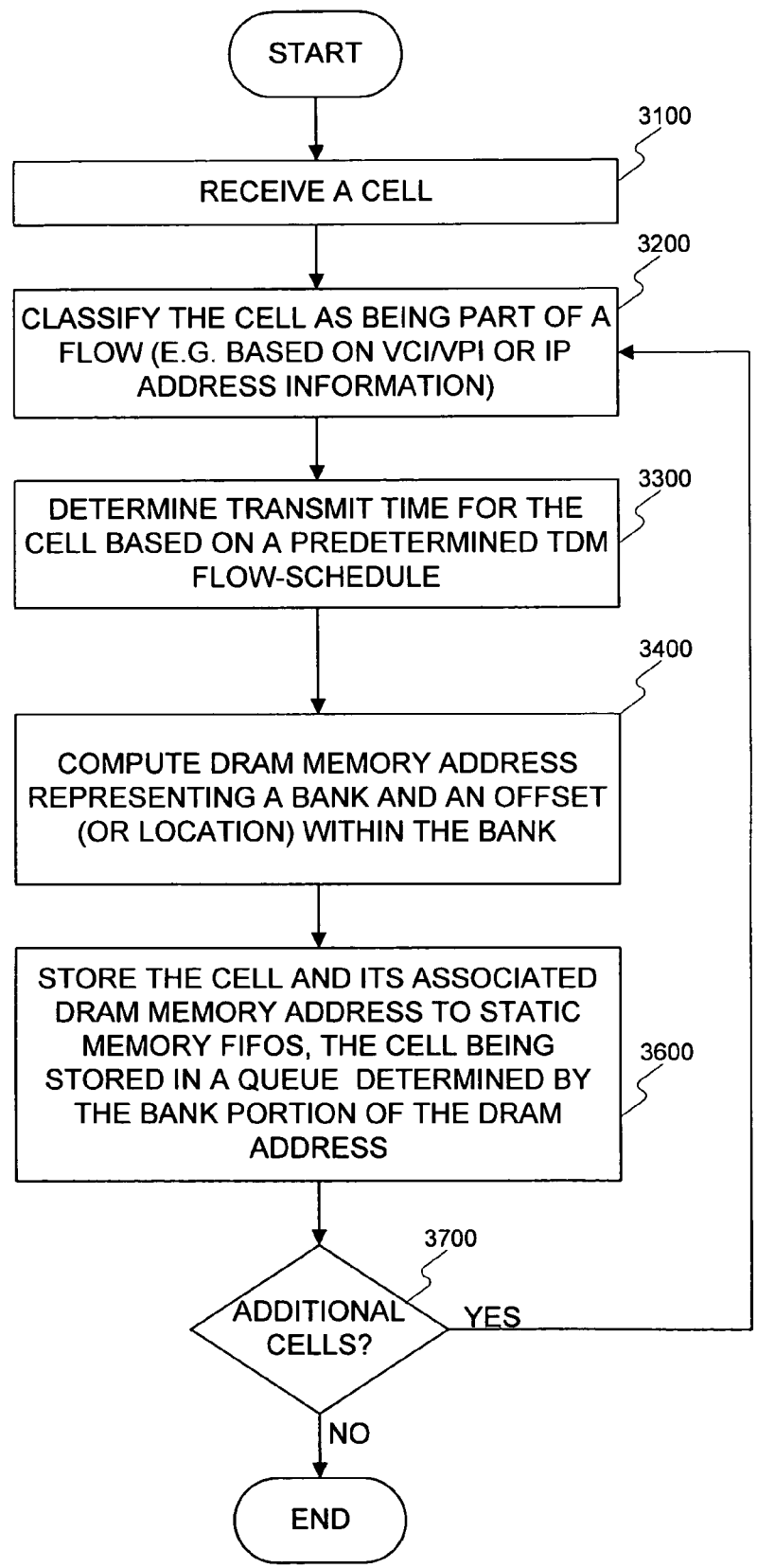
FIG. 3 is a flowchart showing exemplary steps for storing in FIFO (first in, first out) buffer queues in accordance with systems and methods consistent with the present invention.

With the above overview of system 1000, FIG. 3 depicts the steps associated with metering and buffering consistent with one embodiment of the present invention. Referring to FIGS. 1 and 3, flow classifier module 1100 may receive a cell (e.g., cell 1601) and classify that cell as being part of a flow by assigning a flow number to the cell (steps 3100-3200). Flow state scheduler module 1200 may then determine a transmit time for the cell based on a predetermined TDM flow schedule, such as the one depicted in FIG. 2 (step 3300). Next, flow state scheduler module 1200 may compute the DRAM memory address, e.g., the bank and location in the bank in TDM DRAM buffer 1500 (step 3400) and transmit (or write) the cell to one of queues 1310-1340. In some embodiments, the computed transmit time may actually be the DRAM address. For example, for a 4-bank DRAM, the lowest two bits of the DRAM address may be the bank number (and thus the SRAM queue number), and the upper bits of the DRAM address may be the upper address bits within the DRAM bank. Alternatively, a table or schedule may be used to map the transmit time to a bank number in module 1500. Static memory FIFO module 1300 may then store the cell and the associated DRAM memory address in one of the queues 1310-1340 (step 3600). If additional cells arrive at flow classifier module 1100, the cells may also be processed as described above with steps 3200-3600.

When a document is stored on a computer hard drive, the stored data is structured such that a byte of data is probably adjacent to other bytes from the same document. Known memory access techniques, such as pipelining and caching, can take advantage of such structure to improve memory access speed. Unlike a document stored in a hard drive, cells may be associated with different flows, having no structure that facilitates the use of known memory access techniques. By way of steps 3200-3600, randomly arriving cells from different flows are stored in static memory FIFO module 1300 in a structured manner. For example, cells are placed into DRAM banks in such a way that the DRAM bank accesses become more predictable, and thus the DRAM random bank access timing constraints can be met. The SRAM queues serve to buffer cells so that the order in which they are written to the DRAM banks can also be made more predictable, rather than being based on the random arrival order of the cells of various flows.

To receive a cell and then classify that cell as being part of a flow by assigning a flow number to the cell (steps 3100-3200), flow classifier module 1100 may receive a cell, such as cell 1601, from network 1010 and then classify that received cell. FIG. 1 depicts cell 1601 classified as flow one at cell 1602. The flow number may be assigned using various techniques, which are known and commercially available. For example, in the case of ATM cells, classification may be performed using the VCI/VPI. In particular, the VCI and VPI may be used to determine a virtual channel between a source and a destination. All of the cells associated with the virtual channel may be assigned the same flow number. In the case of IP packets, a packet may be assigned to a flow based on, for example, port number(s), a source or destination address associated with the packet, a protocol associated with the packet, and/or the data contents of the packet, such as URL (Uniform Resource Locator) information contained in a packet. Specifically, packets received having the same source and destination address pairs and the same. User Datagram Protocol (UDP) source and destination ports may be assigned to the same flow number.

To determine a transmit time for the cell based on a predetermined TDM flow schedule 2000 (step 3300), flow state scheduler module 1200 determines which flow is currently being transmitted from the DRAM buffer module 1500, reads the flow number of the received cell such as cell 1602, and then determines the transmit time for the received cell (e.g., the number of time periods until the next available transmission time for the flow). For example, when cell 1602 represents flow one and the current flow being transmitted is flow three (see pointer 2900 at FIG. 2 pointing to flow three 2220 (*a*)), transmit time computer module 1210 determines that transmit time for the cell 1602 is in one time period 2252(*a*).

Based on the transmit time, flow state scheduler 1200 may then determine a DRAM address representing a bank in module 1500 and a location, such as an offset within the bank (step 3400). For example, banks and corresponding memory locations (also referred to as memory cells) within each bank are pre-assigned a schedule for transmission from module 1500. If a cell is scheduled for transmission in 5 time periods (t+5), a specific bank and location in the bank can be determined since each bank and its memory locations have pre-assigned read and transmit times.

The determined bank and memory location for a cell (or packet) can then be used to determine the corresponding queue in static memory FIFO 1300. The cell and its associated DRAM address may then be stored in the determined one of queues 1310-1340 of static memory FIFOs 1300 (step 3600). For example, module 1300 may determine that a cell is assigned to flow 1, which corresponds to a transmit time of 1 time period. Based on the value of 1 time period, the corresponding DRAM bank may be determined to be bank two 1530 with an offset of seven. Module 1300 then stores the cell and the corresponding address (bank two and offset seven) in static FIFO queue two 1320.

Figure 4:
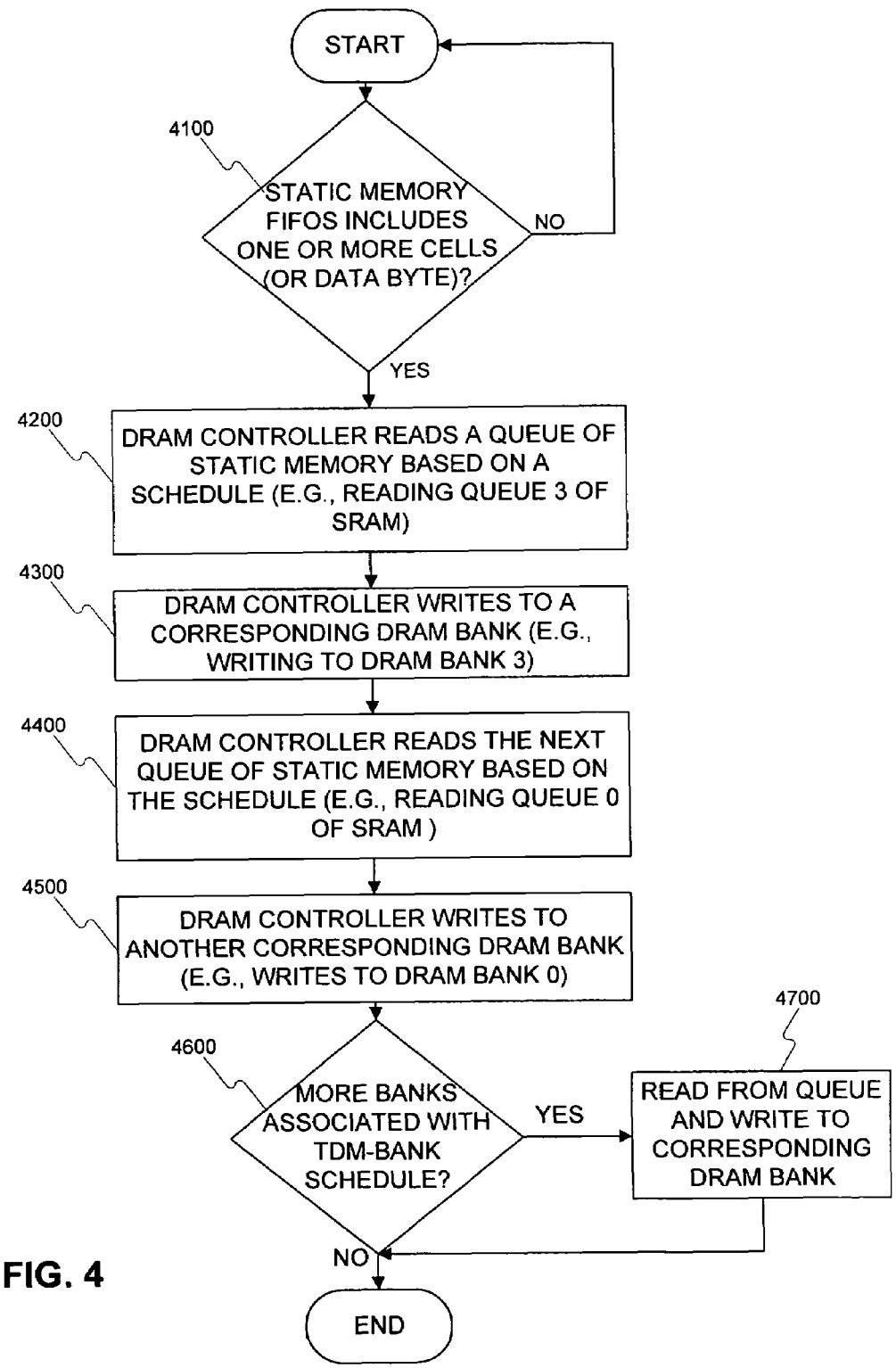
FIG. 4 is a flowchart showing exemplary steps for writing to DRAM in accordance with systems and methods consistent with the present invention.

FIG. 4 is an exemplary flowchart for writing to, and reading from TDM DRAM buffer module 1500. Referring to FIGS. 1 and 4, when static memory FIFO module 1300 includes one or more cells, DRAM TDM controller module 1400 may read a cell in one of queues 1310-1340 based on a schedule, which is described in greater detail below with respect to FIG. 5 (steps 4100-4200). DRAM TDM controller module 1400 writes the cell read from the queue to a corresponding one of banks 1510-1540 in TDM DRAM buffer module 1500 (step 4300). DRAM TDM controller module 1400 may then read another one of queues 1310-1340 and then write the cell in another one of banks 1510-1540 (steps 4400-4500).

Figure 5:
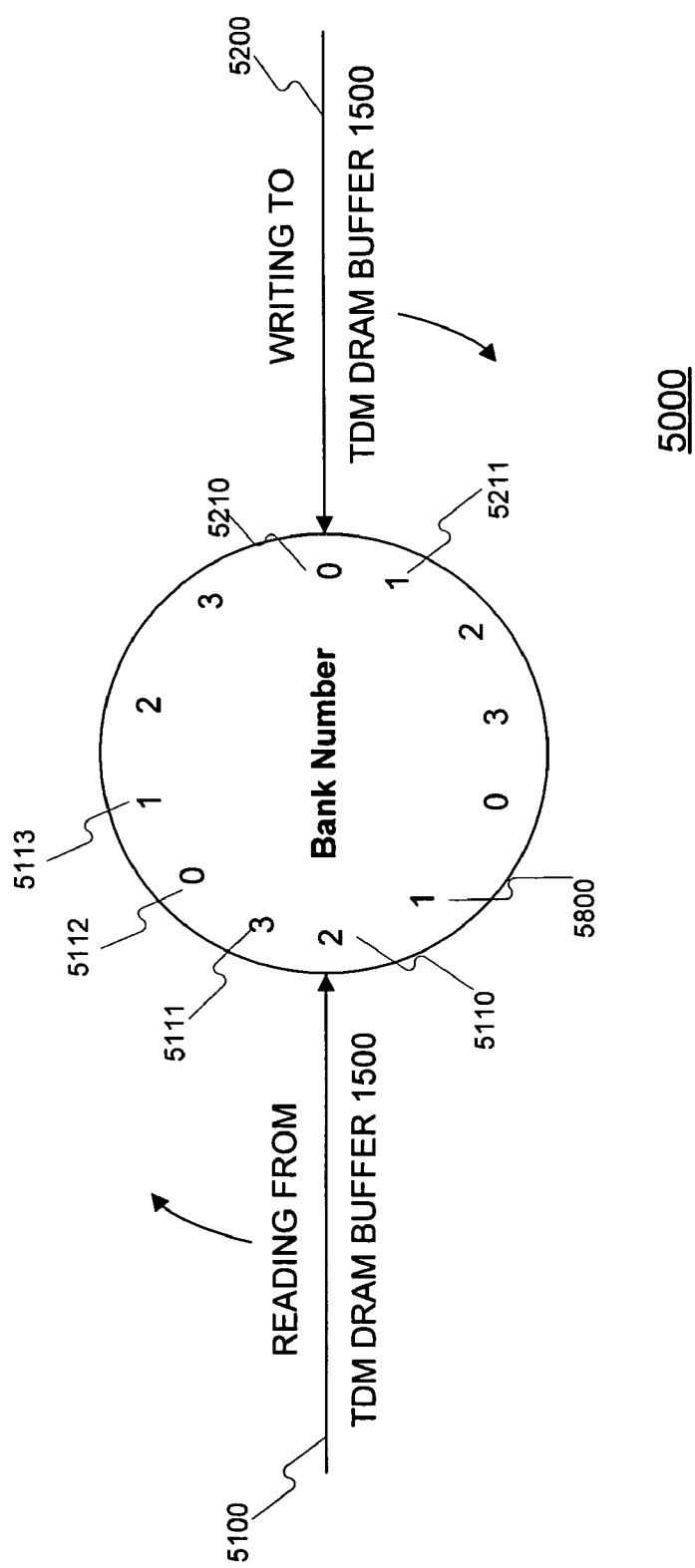
FIG. 5 illustrates a TDM schedule for reading from and writing to DRAM in accordance with systems and method consistent with the present invention.

An exemplary TDM bank schedule 5000 is depicted in FIG. 5. Referring to FIG. 5, DRAM TDM controller module 1400 writes to and reads from TDM DRAM buffer module 1500 based on TDM bank schedule 5000. For example, FIG. 5 depicts that at the time period depicted by FIG. 5, DRAM TDM controller module 1400 may read a cell from bank two 5110 (see pointer at 5100) for subsequent transmission to network 1011. Moreover, TDM controller module 1400 may write a cell (read from a static queue) to bank zero 5210 (see pointer at 5200). During the next period, DRAM TDM controller module 1400 may read bank three 5111 and write to bank one 5211. Although FIG. 5 depicts reading and writing as occurring within the same time period, such reading or writing may occur at anytime. Moreover, the read and write operations may occur in parallel, if banks are on separate buses, or such operations may be interleaved (first a read operation on bank 0, then a write on bank 2, then a read on bank 1, etc.) on a single memory port bus.

In some embodiments, banks 1510-1540 are read in a so-called "striped" manner, i.e., reading each of banks 1510-1540 at the same offset location and then incrementing the offset location before reading each of the banks 1510-1540 again. For example, the read offset address (representing which location in the DRAM buffer is being read) is incremented by the size of a single cell each time pointer 5100 completes a revolution around schedule 5000. The read offset address is incremented until the last cell of each bank in buffer module 1500 is read, at which time the read offset address is reset to an initial read offset value. Furthermore, the offset location (stored as part of the memory address) within a bank is also used to determine a write offset address in module 1500. Accordingly, when a cell is written to a bank in buffer module 1500 (as represented by pointer 5200), the location within the bank is determined based on the stored offset location.

One of ordinary skill in the art will recognize that TDM bank schedule 5000 is only exemplary and that any other mechanism of controlling TDM DRAM buffer module 1500 reads and writes may be used instead. With the above general overview of steps 4100-4700, the following provides a more detailed description of those steps.

Referring to FIGS. 1 and 4, by way of example, if TDM DRAM buffer module 1500 includes four banks 1510-1540, static memory FIFO module 1300 would include four queues 1310-1340. As noted above, static FIFO buffers 1310-1340 may include one or more cells, as depicted by the numerical data within brackets, e.g., [03] (step 4100). In particular, FIG. 1 shows that static buffer 1310 includes data [03] representative of a cell associated with bank zero. Similarly, each of buffers 1310-1340 includes cell data representative of a respective bank.

Referring to FIGS. 4 and 5, based on TDM bank schedule 5000, DRAM TDM controller module 1400 writes the contents of queue three 1340 to bank three 1540, with the bank currently being written to represented by pointer 5200 (steps 4200-4300). In particular, DRAM controller module 1400 may write the respective contents of queues 1310-1340 to respective banks 1510-1540 in a sequence defined by schedule 5000. Schedule 5000 depicts the write sequence, starting at pointer 5200, as 0, 1, 2, 3, 0, 1, 2, 3, 0, 1, 2, and 3. For example, TDM controller module 1400 may write cell data [33] from queue three 1340 to bank three 1540 (steps 4200-4300).

Next, DRAM TDM controller module 1400 writes the contents of queue zero 1310 to bank zero 1510, with the pointer 5200 moving clockwise one position from 5210 to 5211 (steps 4400-4500).

Figure 6:
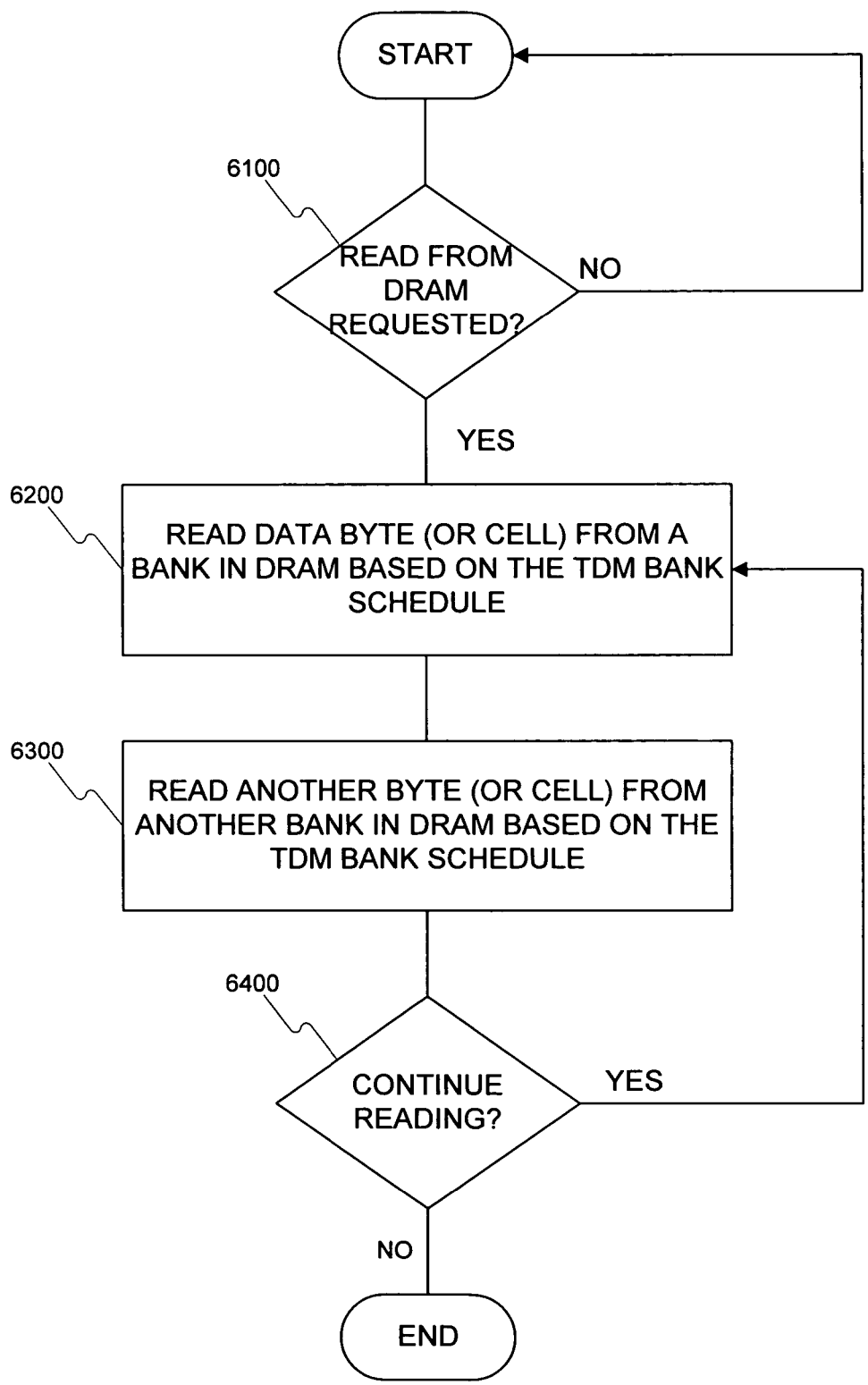
FIG. 6 is another flowchart showing exemplary steps for reading from DRAM in accordance with systems and methods consistent with the present invention.

Once stored in TDM DRAM buffer module 1500, the cells are buffered—enabling thus metering and/or other forms of processing. When buffered, cells are read and transmitted to network 1011 as part of a metering function. FIG. 6 depicts exemplary steps consistent with an embodiment of the present invention for reading such cells for transmission. Referring to FIG. 6, when a read is requested (or enabled) by, for example, a metering module that controls cell traffic onto network 1011, DRAM TDM controller module 1400 may read one of banks 1510-1540 based on TDM bank schedule 5000 (steps 6100-6200). Next, DRAM TDM controller module 1400 may read the next bank 1510-1540 and continue reading banks based on the TDM bank schedule 5000 (steps 6300-6400). Meanwhile, the cells that are read are then transmitted to network 1011.

When the buffer 1500 is used to support metering traffic onto a network, a fixed period clock (e.g., of one cell time duration) would enable data reads from banks 1510-1540 in a controlled manner to control the cell traffic on to network 1011. Although the embodiments herein describe the used of metering, systems and methods consistent with the present invention may be used in other environments.

To read a cell from one of the banks 1510-1540, TDM controller module 1400 reads one of banks 1510-1540 based on a schedule, such as schedule 5000 (step 6200). Referring to FIG. 5, DRAM controller module 1400 reads from banks 1510-1540 in a sequence defined by schedule 5000. For example, schedule 5000 depicts the read sequence, starting at pointer 5100, as 0, 1, 2, 3, 0, 1, 2, 3, 0, 2, and 3. Moreover, the offset location in each bank may be incremented after each series of reads—providing a so-called "striped" reading of the memory banks 1510-1530. For example, each of banks 1510-1530 may be read first with an offset 0, while the second read may have an offset of 32, and an offset of 48 for the third read, and so on until all of the banks have been read. When TDM controller module 1400 reads the contents of a bank, such as bank two 1530, the read data may then be transmitted to network 1011.

Referring again to FIG. 6, to read another bank (step 6300), TDM controller 1400 reads the next bank according to schedule 5000. Returning to the above example, since bank two 1530 was last read, the next bank on schedule 5000 is bank three 1540, as depicted by pointer 5100 rotating one period clockwise from 5110 to 5111. Any data read may be transmitted for further processing and/or follow-on transmission. TDM controller 1400 may continue reading based on schedule 5000 (step 6400). One of ordinary skill in the art may recognize that other schedules may be used instead of schedule 5000.

Table 1 depicts pseudocode combining the reading and writing steps associated with FIGS. 4 and 6. Referring to Table 1, RBANK represents the bank currently being read; ROFFSET represents the offset location in the bank being read; N represents the number of banks in DRAM; WBANK represent the bank currently being written to; and WOFFSET represents the offset location in the bank being written to. As noted above, when a flow is assigned to a cell, the transmit time is used to determine a DRAM memory address, such as a bank and corresponding offset location in the bank. Moreover, in some embodiments, a flag is used to connote empty memory cells within the DRAM.

TABLE 1

| Pseudocode |
|---|
| 1) RBANK = 0; ROFFSET = 0; WBANK = N/2; |
| 2) READ a memory cell from bank RBANK starting at ROFFSET and transmit it. |
| 3) Increment RBANK by 1. |
| 4) If RBANK > N, set RBANK = 0; |
| 5) Increment ROFFSET by the memory cell size in the DRAM. |
| 6) If ROFFSET > DRAM bank size, set ROFFSET = 0 |
| 7) If SRAM queue WBANK is empty, go to step 10 |
| 8) Take a memory cell and its WOFFSET value from SRAM |

TABLE 1-continued

Pseudocode

```
    queue WBANK
9)  Write the memory cell into DRAM bank WBANK starting
    at location WOFFSET
10) Increment WBANK by 1.
11) if WBANK > N, set WBANK = 0;
12) Go to step 2.
```

The systems disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

Although the above embodiments are illustrated by way of cells, one of ordinary skill in the art will recognize that the embodiments described above may also be used with any type of information or data. Moreover, although the above embodiments describe the use of metering, the systems and methods described herein may be used in any other environment.

What is claimed is:

1. A method of buffering one or more cells comprising:
   receiving a cell;
   classifying the cell as one of a set of flows, wherein each flow has a corresponding flow number;
   transmitting the cell to a first queue of a set of queues of static memory, such that the queue corresponds to one of a set of banks of dynamic memory;
   determining, based on a transmission time, one of the set of banks for storage of the cell;
   writing the cell to the corresponding one of the set of banks; and
   storing in the queue the transmitted cell and a transmit time representing when the cell will be transmitted from dynamic memory,
     wherein the transmit time is calculated by:
       determining the flow number corresponding to the cell,
       determining a current flow and corresponding flow number transmitted from the dynamic memory, and
       determining the number of time periods between the current flow and the cell.

2. The method of claim 1, further comprising:
   storing in the queue the transmitted cell and a memory address representing a location in one of the set of banks.

3. The method of claim 1, wherein receiving the cell further comprises:
   receiving the cell from a first network.

4. The method of claim 1, wherein:
   the transmission time is based on the classified flow of the cell.

5. The method of claim 1, further comprising:
   receiving a second cell.

6. The method of claim 5, further comprising:
   classifying the second cell as a second flow of the set of flows.

7. The method of claim 1, further comprising:
   transmitting the second cell to a second queue of the set of queues of static memory, such that the second queue corresponds to a second bank.

8. The method of claim 7, further comprising:
   storing the second cell in the second queue.

9. The method of claim 7, further comprising:
   writing the second cell to the second bank.

10. The method of claim 1, wherein writing the cell to the corresponding bank further comprises:
    reading, based on a schedule, the cell from one of the set of banks.

11. The method of claim 1, wherein writing the cell to corresponding bank further comprises:
    writing based on a schedule, the schedule representing when each of the banks are accessed for writing.

12. The method of claim 1, further comprising:
    reading, based on a schedule, the cell written to the corresponding bank of dynamic memory.

13. The method of claim 12, further comprising:
    transmitting the cell, read from the corresponding bank, to a second network.

14. The method of claim 1, further comprising:
    using, as static memory, a static random access memory (SRAM).

15. The method of claim 1, further comprising:
    using, as dynamic memory, dynamic random access memory (DRAM).

16. A method of buffering one or more cells comprising:
    receiving a cell;
    classifying the cell as one of a set of flows, wherein each flow has a corresponding flow number;
    transmitting the cell to a first queue of a set of queues of static memory, such that the queue corresponds to one of a set of banks of dynamic memory;
    determining, based on a schedule, one of the set of banks for storage of the cell;
    writing the cell to the corresponding one of the set of banks; and
    storing in the queue the transmitted cell and a transmit time representing when the cell will be transmitted from dynamic memory,
      wherein the transmit time is calculated by:
        determining the flow number corresponding to the cell,
        determining a current flow and corresponding flow number transmitted from the dynamic memory, and determining the number of time periods between the current flow and the cell.

17. A system for buffering one or more cells comprising:
means for receiving a cell;
means for classifying the cell as one of a set of flows, wherein each flow has a corresponding flow number;
means for transmitting the cell to one of a set of queues of static memory, such that the queue corresponds to one of a set of banks of dynamic memory; means for determining, based on a transmission time, one of the set of banks for storage of the cell;
means for writing the cell to the corresponding one of the set of banks; and
means for storing in the queue the transmitted cell and a transmit time representing when the cell will be transmitted from dynamic memory,
  wherein the transmit time is calculated by:
    determining the flow number corresponding to the cell,
    determining a current flow and corresponding flow number transmitted from the dynamic memory, and
    determining the number of time periods between the current flow and the cell.

18. A system for buffering one or more cells, the system comprising:
a processor; and
a memory,
wherein the processor and the memory are configured to perform a method comprising:
  receiving a cell;
  classifying the cell as one of a set of flows, wherein each flow has a corresponding flow number;
  transmitting the cell to one of a set of queues of static memory, such that the queue corresponds to one of a set of banks of dynamic memory;
  storing in the queue the transmitted cell and a transmit time representing when the cell will be transmitted from dynamic memory; and
  writing the cell to the corresponding one of the set of banks, wherein the transmit time is calculated by:
    determining the flow number corresponding to the cell,
    determining a current flow and corresponding flow number transmitted from the dynamic memory, and
    determining the number of time periods between the current flow and the cell.

19. The system of claim 18, further comprising:
storing in the queue a memory address representing a location in one of the set of banks.

20. The system of claim 18, wherein receiving the cell further comprises:
receiving the cell from a first network.

21. A computer-readable medium containing instructions to configure a data processor to perform a method for buffering, the method comprising:
receiving a cell;
classifying the cell as one of a set of flows, wherein each flow has a corresponding flow number;
transmitting the cell to one of a set of queues of static memory, such that the queue corresponds to one of a set of banks of dynamic memory;
storing in the queue the transmitted cell and a transmit time representing when the cell will be transmitted from dynamic memory; and
writing the cell to the corresponding one of the set of banks, wherein the transmit time is calculated by:
  determining the flow number corresponding to the cell,
  determining a current flow and corresponding flow number transmitted from the dynamic memory, and
  determining the number of time periods between the current flow and the cell.

22. The computer-readable medium of claim 21, further comprising:
storing in the queue a memory address representing a location in one of the set of banks.

23. The computer-readable medium of claim 21, wherein receiving the cell further comprises:
receiving the cell from a first network.

* * * * *